United States Patent [19]

Suppon et al.

[11] Patent Number: 5,330,340
[45] Date of Patent: Jul. 19, 1994

[54] PELLETIZER WITH AUTOMATIC KNIFE ADJUSTMENT

[75] Inventors: Frederick C. Suppon; Chester E. Alkiewicz, both of Fulton, N.Y.

[73] Assignee: The Black Clawson Company, Middletown, Ohio

[21] Appl. No.: 857,461

[22] Filed: Mar. 25, 1992

[51] Int. Cl.$^5$ .............................................. B29B 9/02
[52] U.S. Cl. ........................... 425/142; 425/67; 425/168; 425/311; 425/DIG. 230; 264/142
[58] Field of Search ................. 264/40.1, 40.5, 141, 264/142; 425/142, 67, 155, 162, 164, 169, 171, 172, 168, 167, 149, DIG. 230, 311

[56] References Cited

U.S. PATENT DOCUMENTS

| | | | |
|---|---|---|---|
| 3,435,377 | 3/1969 | Franklin | 73/DIG. 1 |
| 3,479,536 | 11/1969 | Norris | 73/DIG. 1 |
| 3,793,627 | 2/1974 | Darrel et al. | 73/593 |
| 3,832,114 | 8/1974 | Yoshida | 425/313 |
| 3,912,434 | 10/1975 | Nagahara et al. | 425/142 |
| 4,023,044 | 5/1977 | Miller et al. | 307/116 |
| 4,088,899 | 5/1978 | Miller et al. | 307/116 |
| 4,520,672 | 6/1985 | Saint-Amour | 264/40.1 |
| 4,529,370 | 7/1985 | Holmes et al. | 425/142 |
| 4,546,658 | 10/1985 | Rocha et al. | 73/862.59 |
| 4,735,103 | 4/1988 | Mussard et al. | 73/862.59 |
| 4,743,190 | 5/1988 | Brunnschweiler et al. | 425/149 |
| 4,782,276 | 3/1988 | Pauley et al. | 425/67 |
| 4,979,887 | 12/1990 | Groebli et al. | 425/171 |
| 5,110,523 | 5/1992 | Guggiari | 425/142 |
| 5,145,693 | 9/1992 | Hinzpeter et al. | 264/40.5 |

FOREIGN PATENT DOCUMENTS

51986 1/1976 Japan.

*Primary Examiner*—Jay H. Woo
*Assistant Examiner*—Duane S. Smith
*Attorney, Agent, or Firm*—Biebel & French

[57] ABSTRACT

A plastic resin pelletizer system for controlling the position of the pellet cutting knife blades in relation to a die plate face includes vibration detection pick-up in the form of a piezoelectric accelerometer mounted to the pelletizer die plate. Characteristic frequencies or a signature output is identified as representing the condition of contact between the blades and the die face, and the amplitude of the characteristic signature is used to indicate the extent or degree of pressure of the contact, in controlling the position of the knives with respect to the die plate.

2 Claims, 12 Drawing Sheets

SIGNAL ACQUISITION SUBROUTINE

START SIGNAL ACQUISITION SUBROUTINE

↓

COMMAND TO DSP:
START ANALOG TO DIGITAL CONVERSION OF THE VIBRATION SIGNAL AND COLLECT SAMPLES.

↓

COMMAND TO DSP:
PERFORM AN FFT ON THE COLLECTED SAMPLES.
FFT EQUATION IN DSP LIBRARY:

$$X_m = 1/N \sum_{n=0}^{N-1} A_n e^{-2i\pi nm/N} \qquad m=0,1...N-1$$

↓

COMMAND TO DSP:
TRANSFER FROM DSP TO THE COMPUTER THE TRANSFORMED SAMPLES.

↓

RETURN TO MAIN PROGRAM

FIG-12

STEPPER MOTOR CONTROL SUBROUTINE:

```
START STEPPER MOTOR
CONTROL SUBROUTINE
        │
        ▼
   ┌─────────┐  Y
   │  NEED   ├──────┐
   │ HOMING? │      │
   └────┬────┘      │
        │ N         │
        ◄───────────┘
        │
        ▼
   ┌─────────┐  Y
   │  AUTO?  ├──────┐
   └────┬────┘      │
        │ N         │
        ◄───────────┘
        │
        ▼
  ┌──────────────┐
  │ RETURN TO    │
  │ MAIN PROGRAM │
  └──────────────┘
```

HOMING: THE OPERATOR ESTABLISHES A REFERENCE POSITION FOR THE KNIFE BLADES WHEN SYSTEM IS FIRST POWERED UP.
1—THE OPERATOR MOVES THE BLADES OFF THE DIE PLATE USING THE HAND CRANK OR THE ON/OFF KEYS ON THE COMPUTER. THE BLADES WILL BE MOVED TO THE FULLY RETRACTED POSITION.
2—THE OPERATOR THEN PRESSES THE HOME KEY AND ESTABLISHES THIS FULLY RETRACTED POSITION AS A ZERO POSITION OR HOME.

BLADE MOVEMENT:
— GAP MODE: THE OPERATOR ENTERS THE GAP AND SEARCH TIME X. THE SYSTEM WILL POSITION THE BLADES TO MAINTAIN THAT GAP. THE SYSTEM WILL SEARCH FOR CONTACT EVERY X MINUTES. THE GAP IS MEASURED FROM THE POINT THAT CONTACT IS MADE.
— CONTACT MODE: THE OPERATOR ENTERS THE DESIRED CONTACT LEVEL (VIBRATION AMPLITUDE) AND BUMP TIME X. AS THE BLADES WEAR THE AMPLITUDE DECREASES, THEREFORE, THE SYSTEM WILL MOVE (BUMP) BLADES TO REACH THAT CONTACT LEVEL EVERY X MINUTES.

MANUAL MOTOR ASSIST:
MOVE KEYS:

BLADES ON: MOVES BLADES ON TO DIE PLATE.

BLADES OFF: MOVES BLADES OFF OF DIE PLATE.

FIG-13

OPERATOR INTERFACE SUBROUTINE:

START OPERATOR INTERFACE SUBROUTINE

SCAN INPUTS: DEPENDING ON THE SCREEN, THERE WILL BE OPERATOR INPUTS (i.e. GAP, CONTACT LEVEL, CYLE TIME, SET FREQUENCY WINDOW) SCAN FUNCTION KEYS: ALL DISPLAY HAVE FUNCTION KEYS FOR SEVERAL FUNCTIONS (i.e. GO TO ANOTHER DISPLAY, MOVE BLADES, START/STOP)

DRAW DISPLAYS: DRAW TITLES, WORDS, LABELS, BOXES, GRAPHS. UPDATE NUMBERS AND GRAPHS: REDRAWS GRAPHS AND NUMBERS AS THEIR ARE COLLECTED AND PROCESSED.

RETURN TO MAIN PROGRAM

PELLETIZER WITH AUTOMATIC KNIFE ADJUSTMENT

BACKGROUND OF THE INVENTION

This invention relates to plastic resin pelletizers and more particularly to apparatus and method for the adjustment of pelletizer knives in relation to the cutting plane or extrusion face of a multiple orifice extrusion die.

Underwater plastic resin pelletizers generally incorporate either manual or motor driven apparatus for adjusting the blades of a knife blade assembly in relation to the cutting surface or face of the extrusion die. It is important to define and maintain this relationship to provide for a prolonged life of the cutting edges of the knife blades and to ensure proper cutting of polymers in an effective manner.

Various control arrangements have been suggested for determining the position of the cutting knives with respect to the die extrusion face, or for determining when the cutting knives have come into physical contact with the die face. One such arrangement, as shown in the Holmes et al, U.S. Pat. No. 4,529,370, senses the onset of electrical conductivity between the rotating knife and the die face. Such an arrangement, which detect the presence or absence of conductivity, requires that the knife mounting shaft and bearings be electrically isolated from the die plate itself. This results in substantial additional costs and complications to the design and construction of the pelletizer.

Arrangements which rely upon the presence of conductivity, to determine the position of the knife, can only indicate that a knife blade is or is not in contact with the die plate itself. They cannot accurately or effectively determine the extent or degree of contact pressure.

A second concept which has been employed for determining blade position resides in the employment of proximity detectors in the die plate as shown in Nagahara et al, U.S. Pat. No. 3,912,434. The conductors or sensors in the die plate are insulated from the nozzles. A pulse counter is used to determine when contact is made, as picked up by the sensors. When all of the knives are contacting, all of the pulses should be present. However, this arrangement does not provide accurate information as to the extent or degree of contacting pressure.

Proximity sensors have the disadvantage of difficulty in adjustment and calibration. Such systems also have the difficulty of having to design the die plate so that the sensors can be embedded therein, and the sensors themselves have to survive the heat of plastic extrusion, the presence of the plastic material, and the presence of water in an underwater pelletizer. An improperly positioned sensor may be cut or damaged by a knife.

A further disadvantage of a proximity sensor system is that the system cannot compensate for die wear. For example, if an operator wants to run his knives at a particular clearance, and sets the sensor system for that clearance, he will be indicating only a knife to sensor proximity. Therefore, when the die plate wears, the effective gap will be increased by the amount of wear, but the sensor will continue to indicate the spacing between the sensor and the knife blades.

A need exists for a pelletizer in which the contact of the knife with the die plate face may be unfailingly detected, and the extent and or pressure of contact may be monitored to permit continuous running contact under low pressure or to permit and provide safely for higher pressure contact for specific purposes, such as for knife blade sharpening.

SUMMARY OF THE INVENTION

The invention is directed to a pelletizer knife position control apparatus and method in which one or more characteristic vibrations are measured and processed to provide a positive indication of knife/die plate contact, and further to provide an indication of the extent or pressure of such contact or whether the contact is within a range or "window" of pressures. In the realization of this invention, means are provided by which characteristic frequencies of vibrations are determined and detected during knife contact. Such characteristic frequencies fall within a defined domain, and thereby form a positive indication or "signature" that the knife blades are in contact with the die face.

In the operation of the invention, a particular frequency "signature" associated with knife blade die face contact is determined. This "signature" may be in the form of a single prominent frequency, or may be a pattern or family of frequencies, which is unique to a particular condition including cutting speed, number of blades, etc. This signature thereafter is used to announce the existence of blade/die face contact. The amplitude of such signature is used to measure the extent or pressure of contact, Having thus established a characteristic frequency or family of frequencies, the presence of which positively identifies knife contact, the knives may then be operated in any one of a number of modes. One such mode can provide or define a particular gap between the blades and the die face, if desired. Alternatively, an actual contacting position may be maintained with safety. The latter is not possible with the conductivity signalling devices and is difficult, if not impossible, to maintain in the more complicated proximity indicating devices.

Preferably, the pick-up device mounted or attached to the pelletizer die plate body is one which is responsive to acceleration and converts such movements into an electrical signal for further processing. Such a pick-up, while it could be acoustical or mechanical, is preferably a direct-contacting, piezoelectric accelerometer. The signal processing may be by means of an industrial computer having digital signal processing capability and software which will perform a Fast Fourier Transform (FFT) on the detected vibration signal to convert the signal from a time domain into a frequency domain. Observation of the frequency domain before and after blade contact provides identification of one or more characteristic or signature vibrational signal which thereafter provides a positive indication of knife blade contact against the die plate.

Such a signal establishes a reference point. From this, the position of the blades may be adjusted by known or fixed increments to define a specific running gap, or may be caused to run in continuous and adjusted contact, such that a predetermined signal amplitude is maintained as the blades wear, thereby providing for automatic wear adjustment. The actual blade adjustment can be done manually or automatically in response to the signals.

Apparatus and method according to this invention may be used with advantage in new pelletizer installations and also may readily be retrofitted to existing pelletizers. Older or existing systems having mechanical or manual knife adjustments can be easily modified for the purpose of practicing this invention, since the pickup device, preferably a piezoelectric accelerometer, can be mounted on an existing pelletizer die plate with little or no modification to the die. The operation of the device does not depend on embedded sensors in the die plate, nor does it depend upon electrical isolation of the knife or knife shaft with respect to the die plate. Therefore, little or no internal modifications are required to adapt an existing pelletizer for control by the apparatus and method of this invention.

It is accordingly an important object of the invention to provide apparatus and method by means of which a characteristic frequency or vibration may be measured and detected, corresponding to contact of the knife blades of the pelletizer with the die plate, together with control means and apparatus by which the position of the knife blades is controlled in accordance with such frequency detection.

A further object of the invention is the provision of a system by means of which the contact pressure between knife blades and a die plate face of a pelletizer may be controlled, and by which wear of the knife blade edges and cutting face may be compensated.

Another object of the invention is the provision of a control system, as outlined above, in which electric time domain signals are transformed to a frequency domain, and the occurrence of frequencies within a specific frequency domain or range is noted and used to indicate contact by rotating pelletizer knives with a pelletizer die face.

A further object of the invention is the provision of versatile control means which may be retrofitted to existing pelletizers for accurately indicating and controlling the position of rotating knife blades against an extrusion die plate face.

These and other objects and advantages of the invention will be apparent from the following description, the accompanying drawings and the appended claims.

BRIEF DESCRIPTION OF ACCOMPANYING DRAWINGS

FIGS. 9-13 are flow charts for computer software for controlling the computer and for making Fast Fourier Transforms necessary to convert the digitized accelerometer signal to a frequency domain, in which FIG. 9 represents the main program; FIG. 10 represents the initialization subroutine; FIG. 11 represents the signal acquisition subroutine; FIG. 12 represents the stepper motor subroutine; and FIG. 13 represents the operator interface subroutine.

DESCRIPTION OF PREFERRED EMBODIMENT

Figure 1:
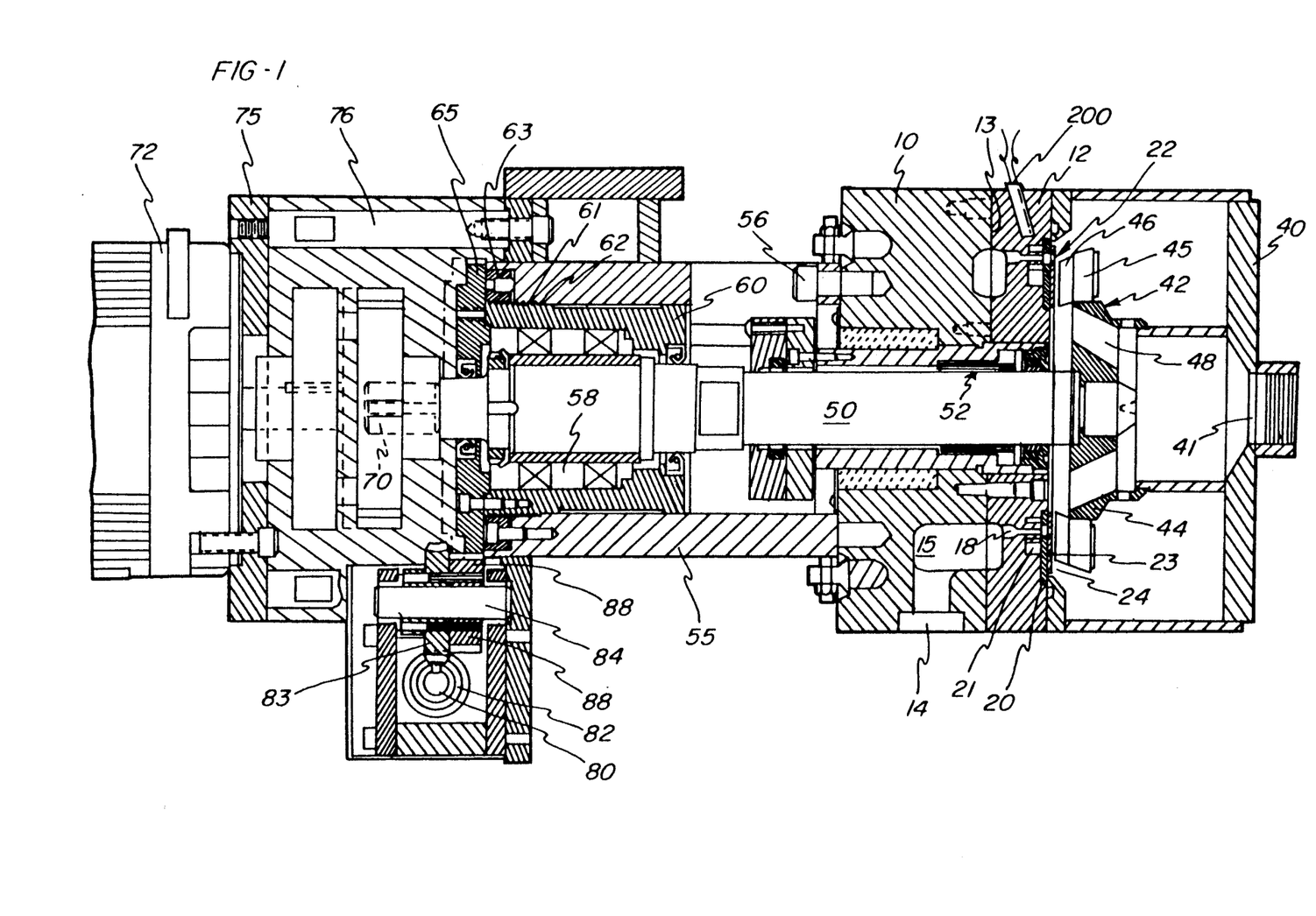
FIG. 1 is a longitudinal sectional view through a typical underwater multiple orifice pelletizer having an annular die plate and a cutting knife positioned in running engagement with the die plate, useful for practicing this invention.

Referring to the drawings, which illustrate a preferred embodiment of the invention, FIGS. 1 through 4 illustrate an underwater pelletizer to which the invention may be applied. In FIG. 1, a die plate mounting housing is illustrated generally at 10. The housing 10 supports an annular die plate body 12 on an end surface 13 of the housing 10.

The housing 10 has a polymer inlet 14 adapted to be connected to the output of a continuous screw-type extruder. The housing 10 in the end surface 13 forms an annular distribution manifold 15 which is closed by the die plate body 12. The manifold 15 provides an annular space through which molten resin or plastic material from an extruder is distributed, for extrusion through multiple die orifices 18 formed partially in the die plate body 12.

The face of the body 12 on the right-hand side, as viewed in the sectional view of FIG. 1, is closed by an annular closure plate 20. The plate 20 is welded in a partial recess formed in the body 12 and forms a closure for internal serpentine-like heating passageways 21 through which hot fluid, such as oil, may flow for the purpose of providing heat to the die extrusion orifices to prevent chilling or freeze-off of the material in the orifices.

Figure 2:
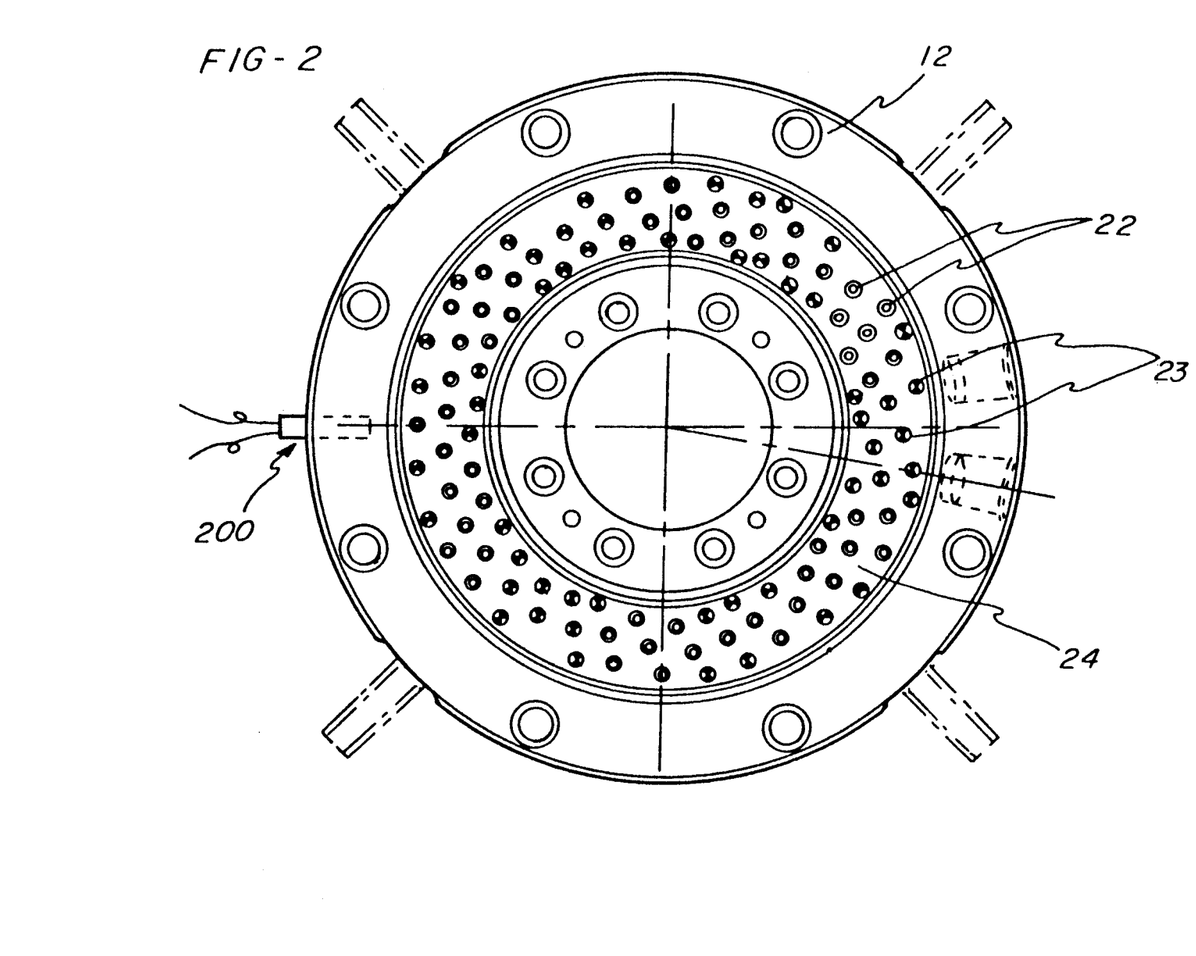
FIG. 2 is a fragmentary end view from the pelletizer water housing showing the die plate face, with the knife assembly removed.

The plate 20 is provided with tungsten carbide inserts in the form of nozzle tips 22. The tips 22 are in axial alignment with and forming an extension of the orifices 18. As shown in FIG. 2, the nozzle tips 22 are arranged in concentric circular rows to form a generally circular or annular nozzle pattern. The pattern also includes tungsten carbide wear stubs 23 set into the plate 20 and interspersed with the tips 22. The space between the wear stubs and the tips is filled with a suitable material of relatively low thermal conductivity, such as "flame sprayed" stainless steel, thereby collectively forming a common cutting face 24 for the die plate body 12. The face 24 is planar and is in common with the exposed surfaces of the wear stubs 23 and the tips 22. While a multiple pattern of five concentric nozzle openings are shown in FIG. 2, it will be understood that this is presented for the purpose of illustration only, and is not intended to limit the scope of the invention, or limit the use of the invention with plastic material pelletizers in general.

The body 12 at the face 24 is closed by a pellet collecting water housing 40. The housing 40 includes an axial water inlet end 41, and a tangential outlet, not shown, by which entrained water and pellets are removed from the pelletizer.

Figure 3:
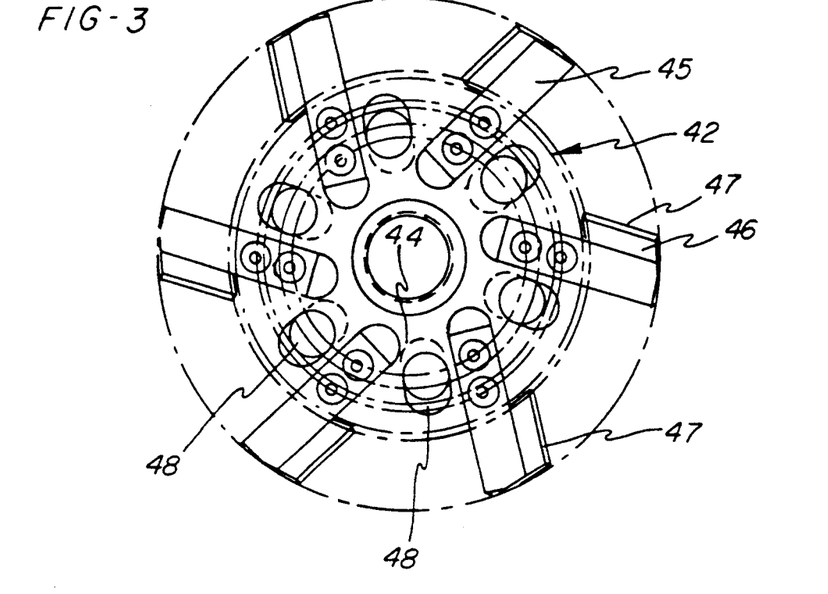
FIG. 3 is an end elevation of the knife assembly including the knife supporting hub and the plurality of radially extending knives used in the pelletizer of FIG. 1.

The pelletizer also includes an axially adjustable knife assembly 42 as shown in the sectional view of FIG. 1, and in plan view in FIG. 3. The knife assembly 42 includes a central water distributing hub 44, and a plurality of generally radially extending knife support arms 45 on which individual cutting knife blades 46 are mounted. The blades 46 have sharpened leading edges 47 which are designed to sweep in close or touching contact with the cutting face 24 of the plate. The hub 44 also has water passages 48 therethrough, which direct water to positions both ahead of and behind the individual blade support arms 45 and the corresponding blades 46. The knife assembly includes a plurality of the cutting blades, and in the embodiment shown, six such blade and blade support arms are shown in a typical arrangement.

The hub 44 of the knife assembly 42 is mounted on a central drive shaft 50 which extends through a sleeve bearing assembly 52 carried in the housing 10. The pelletizer illustrated in FIGS. 1-4 is one in which the knife support shaft is positioned co-axially within the die plate and pelletizer body, although the principles of this invention may be applied to pelletizers of the kind in which a knife shaft extends axially away from the die plate, such as shown in U.S. Pat. No. 4,529,370, previously identified.

The knife support shaft 50, for the purpose of adjustment of the position of the knives, is axially movable in the bearings 52 so that it may be positioned or moved by a positioning mechanism as described below. A rearward housing extension 55 is attached to the housing 10 by bolts 56, and in turn support a thrust bearing 58. The knife supporting shaft 50 is mounted in the thrust bearing 58 for rotation within the extension 55.

An outer race of the thrust bearing 58 is carried within an annular bearing support housing or body 60. The housing 60 is slidably received within the body extension 55. A portion of the housing 60 is threaded at 62. The threads 62 engage a fixed thread at 61 so that rotation of the bearing support housing 60 results in translational movement of the housing 60 in relation to the thread at 61, and thereby positions the knife support shaft 50. The extent of this movement is illustrated by the broken line position of a drive gear 65 mounted on the bearing housing 60. A threaded zero backlash nut 63 minimizes the axial thread backlash between housing 60 and 55.

The drive gear 65 forms the means by which the housing 60 may be rotated, thereby affecting axial translational movement of the shaft 50 and the knife assembly 42. The end of the shaft 50 opposite the assembly 42 is provided with a coupler 70, by means of which the shaft may be coupled to a drive motor 72. The motor 72 is carried on a motor mount 75 and an extension housing 76 in axial alignment with the extension 55.

Figure 4:
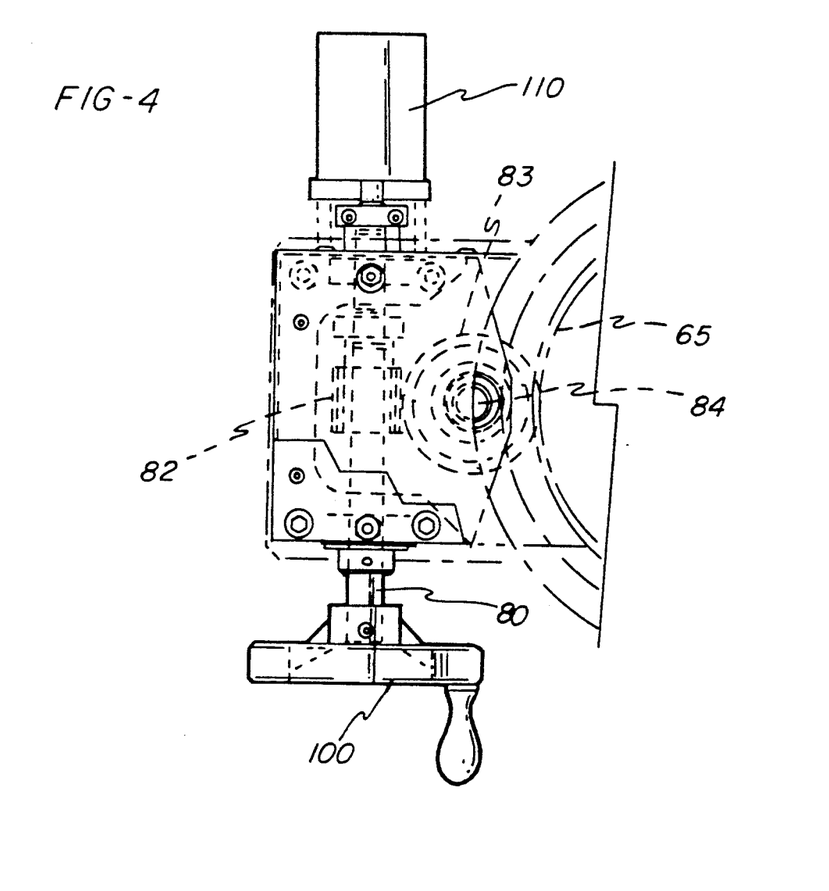
FIG. 4 is a sectional view showing the knife blade mechanical adjusting portion of the pelletizer of FIG. 1.

Means for affecting accurate axial positioning of the knife shaft 50 is illustrated in the drawing of FIG. 4 and includes a transversely positioned shaft 80 having a worm thread 82 thereon in running engagement with a worm gear 83 mounted on a short co-axial shaft 84. The gear 83 and its shaft 84 comprise a gear reduction idler. A second gear 88 is also mounted on the shaft 84 and is pinned to the gear 83 and is in constant mesh with the gear 65 so that rotation of the shaft 80, in either direction, affects an axial movement of the knife drive and supporting shaft 50.

For the purpose of adjusting the axial position of the shaft 50, the input shaft 80 may be provided with a hand wheel 100 as shown in FIG. 4, or is preferably connected to be driven by a reversible positioning motor 110 directly connected to the shaft 80. The positioning motor 110 operates to drive the shaft 80 in positive increments in either direction of rotation, to move the knife assembly 42 either closer to or further from the die plate face 24, depending on the direction of rotation.

The mechanism which has thus been described is a high efficiency underwater pelletizer with a co-axial knife supporting drive shaft which may be accurately moved in increments manually or by the positioning motor 110 to bring the knives into co-action with the die face. It is important that the knives not be permitted to run for an extended period of time with excess or undue force or pressure against the die plate face 24 which would cause relatively rapid wear of the knife surfaces, as well as wear on the corresponding surfaces of the die plate. Also, it is not desirable to permit the knives to run with excessive clearance with the die plate face 24 as this will result in the production of deformed pellets or the smearing of polymer material across the die face.

The means by which the knife assembly may be accurately positioned and controlled includes an accelerometer pick-up diagrammatically indicated at 200 in FIG. 1. The accelerometer pick-up 200 is shown as mounted directly on the die plate 12. An accelerometer position on the die plate housing 12 at a location which is radially outward from the center line of the shaft 50 and with the accelerometer positioned generally normal to the axis of the shaft, it has been found to provide good output signals representative of vibrations of the die housing. Preferably, the method and apparatus uses a piezoelectric type accelerometer, and a suitable accelerometer for this purpose is the amplified accelerometer model AG-714 manufactured by Sensotec, 1200 Chesapeake Avenue, Columbus, Ohio 43212.

While the use of a piezoelectric accelerometer is preferred due to its sensitivity at the frequency ranges of interest, it should be understood that acoustical pick-ups or carbon pile or moving coil transducers or electric stethoscopes are not intended to be excluded, and in fact may provide satisfactory results.

Figure 6:
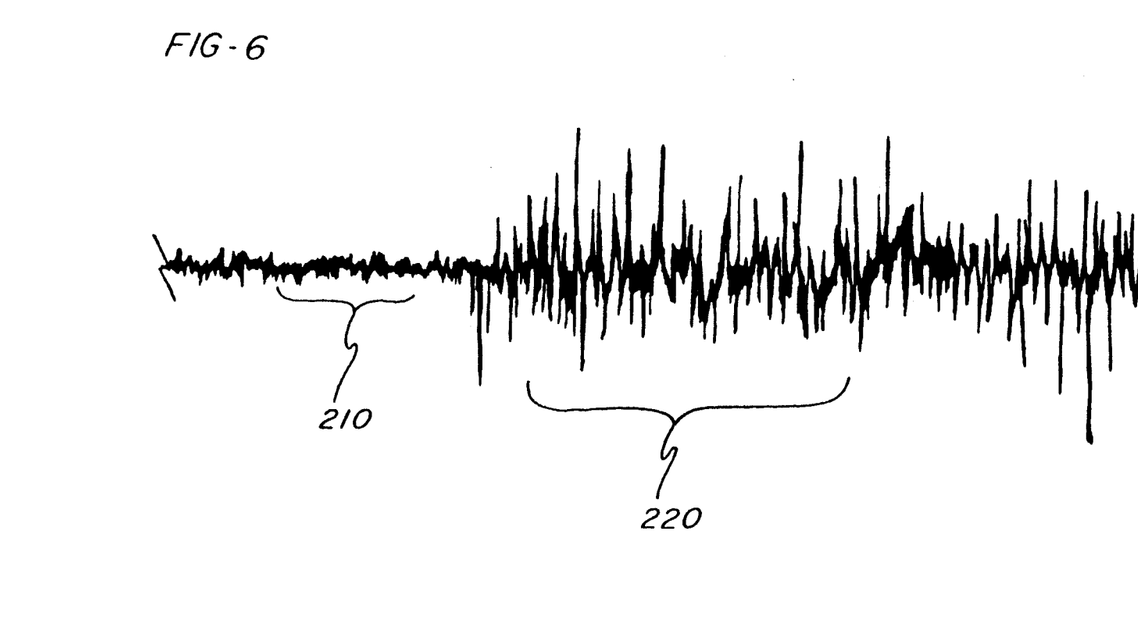
FIG. 6 is an oscilloscope type presentation of the output tracing, on a time domain of a piezoelectric accelerometer, and shows the difference in the trace between no contact and a knife/die plate contact.

FIG. 6 illustrates, on a time domain basis, an oscilloscope trace of the output of the amplified accelerometer 200. The first region identified at 210 represents the tapped output prior to contact between the blades of the knife assembly 42 and the die face. In contrast, the region illustrated at 220 illustrates the typical output of such an accelerometer, on the time domain following such contact. It will be seen that the total output energy has been substantially increased, causing greater amplitude excursions of the output, representing accelerations or vibrations.

While it may be possible simply to detect or measure the change in integrated output from an accelerometer, this does not provide the desired sophistication nor the positive identification of knife contact, since obviously other conditions in the plant or in the pelletizer itself could cause a sudden onset of higher energy output from the acceleration other than blade/die face contact. For this purpose, the signals as shown in FIG. 6 are Fast Fourier Transform to provide a real time representation of frequency distribution.

Figure 7:
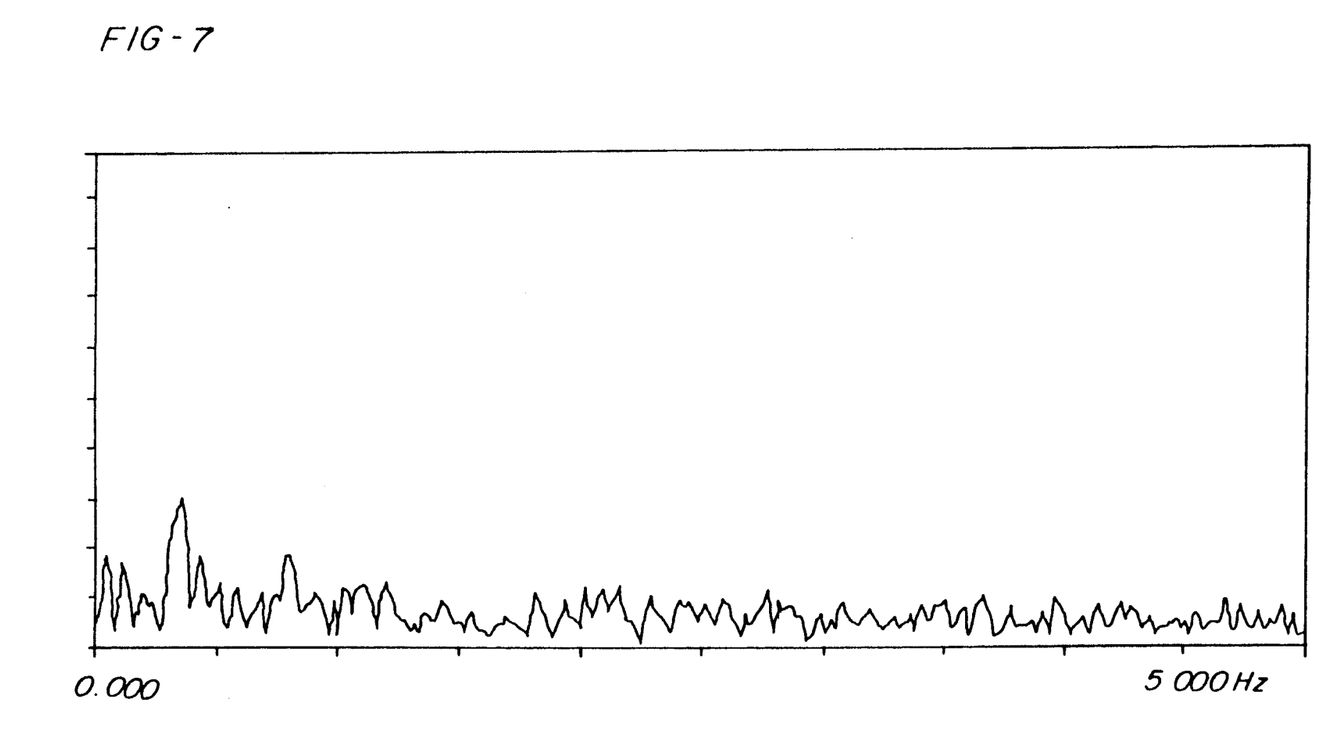
FIG. 7 is a real time Fast Fourier Transform (FFT) analysis with the frequency plotted on the abscissa against amplitude on the ordinate, with an absence of blade/die plate contact.
Figure 8:
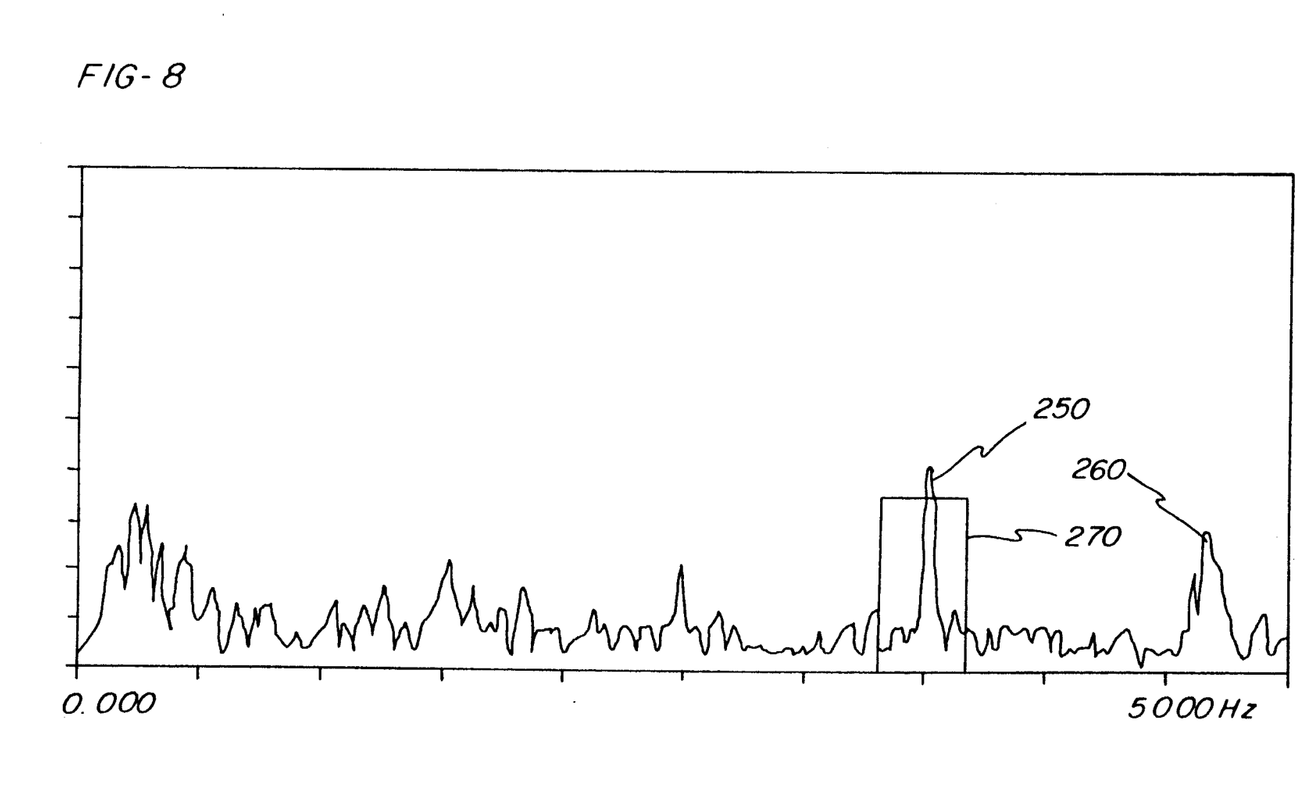
FIG. 8 is an FFT presentation similar to FIG. 7 after contact, and identifying a frequency "signature" and window.

FIG. 7 represents a typical such frequency distribution plot, corresponding to a portion or sample of the region 210 of FIG. 6, prior to blade contact. FIG. 8 illustrates a similar frequency versus amplitude slot representing the condition of the accelerometer output as shown at region 220 in FIG. 6, following knife blade/die plate contact.

A comparison of FIGS. 7 and 8 shows that in addition to a general overall increase in signal amplitude at any given frequency following contact, in this instance two characteristic spikes 250 and 260 have appeared. These spikes, at about 4,000–5,000 Hz, are unique to the condition of contact between the blades and the die face and may be used as "signatures" providing a positive indication of such contact.

As the pressure between the knife edges and the die face is increased, the amplitude of the spikes 250 and 260 increase accordingly and therefore the amplitude over a minimum reference or "noise" level may be used as a direct measurement or indication of the contact force or contact pressure of the knives with the die plate.

FIG. 8 also shows a computer generated window 270 which provides a frequency scanning aperture both as to a frequency range and amplitude, useful in the detection of the signature spike 250 and for controlling the amplitude, where desired. It will be understood that more than one window may be used for the purpose of identifying a particular signature, and in this example, windows may be provided identifying each of the spikes 250 and 260, the coincidence of which provides a positive identification.

The blades may be adjusted a known distance to define a running gap mode, by reversing the direction of axial blade movement, or the blades may be caused to run in constant or continuous contact by maintaining a predetermined amplitude of the signal 250 or signals 250, 260, as the blades wear.

Figure 5:
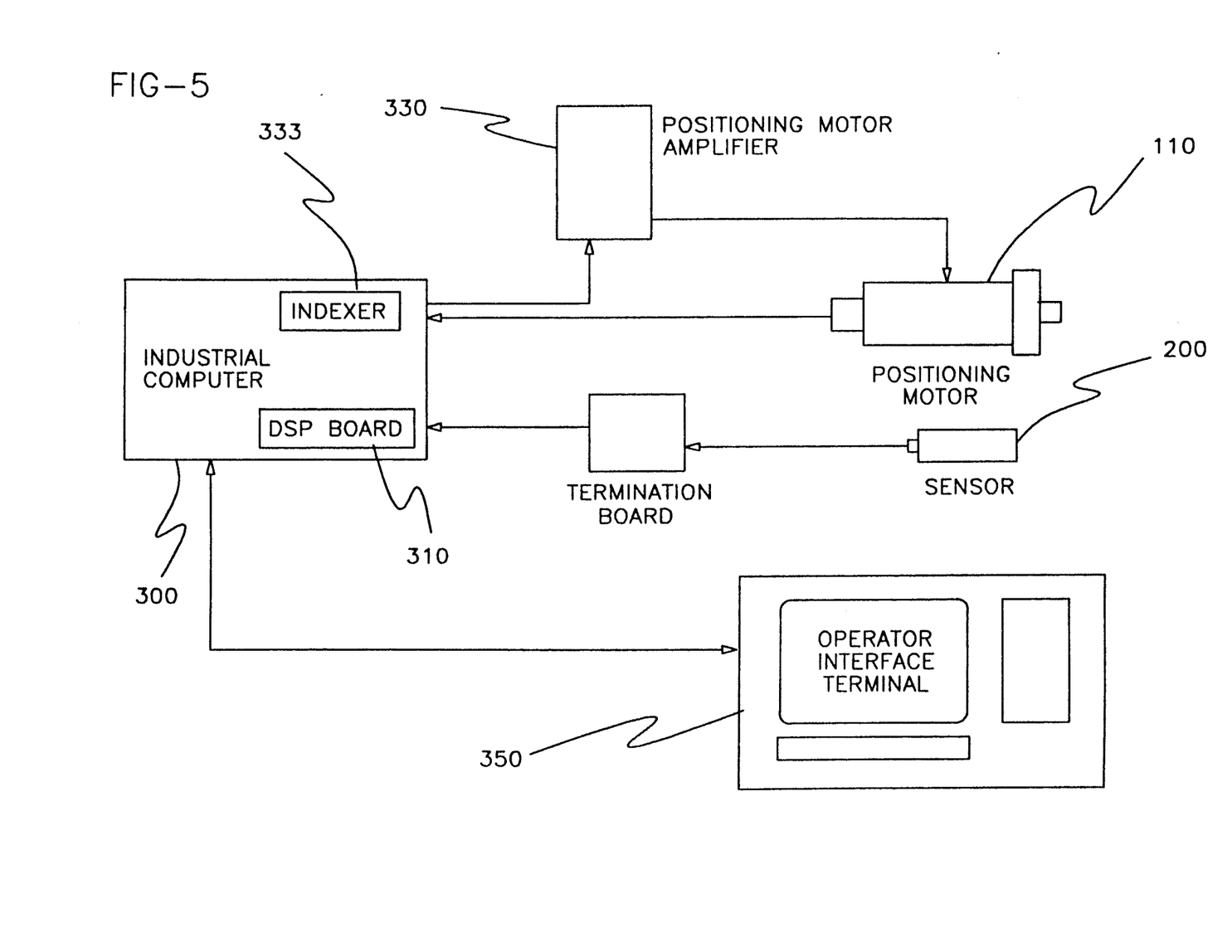
FIG. 5 is a diagram showing the principal components of the invention and their functional interrelation.

FIG. 5 represents a block diagram of a control system for controlling the knife blade position of an underwater pelletizer, as previously described in connections with FIGS. 1-4. For this purpose, an industrial computer 300 may comprise the primary control processing unit (CPU), and may include an 80386 processor and 1-megabyte memory, with a video graphics board. The computer 300 includes a digital signal process board 310 which converts and digitizes the input from the accelerometer 200. A suitable board is the model PCI-20202-C of Burr-Brown Corp., 1141 West Grant Raod #131, Tucson, Ariz. 85705. This board includes a Texas Instruments model TMS-320C25 processor with a clock speed of 28 Mhz. This board also has a high speed analog input module PCI-20019M-1A, with 12 bit resolution and a throughput of 89 Khz.

A suitable positioning motor 110 is that manufactured by Compumotor Division, 5500 Business Park Drive, Rohnert Park, Calif. 94928, model S/SX83-135 with an amplifier 330 and an indexer board 333, both supplied by the same company. The amplifier may be Compumotor's S6-DRIVE and the indexer card for driving the amplifier 330 may be that company's PC-21. The output of computer 300 may be visualized on a conventional VGA display 350.

In order to identify the characteristic signature such as that represented at 250 or 260 in FIG. 8, the pelletizer may be operated at usual speed with water in the housing 40, but without plastic extrusion through the die orifices. The positioning motor 110 or crank 100 may be rotated or driven in such a manner as to bring, with care, the knife assembly 42 toward the die plate face 24. A real time sampled spectrum analysis may be displayed on the operator's screen 350.

Prior to knife contact, the analysis will have an appearance similar to that set forth in FIG. 7. After contact, however, the operator will notice an increase in amplitude of a number of the frequencies, but will also notice a sharp rise in amplitude of one or more of the discrete frequencies, generally above 2500 hertz. One or more of these is then selected, such as the frequency spikes 250, 260, as a positive indication of contact for the particular pelletizer set-up. Thereafter, unless the speed of rotation or knife configuration is altered, this signature will not be found to change its position along the frequency domain.

A window 270 may be written into the program at the frequency spike 250 with a frequency width sufficient to encompass the spike or signature, and with an amplitude of predetermined value or height, corresponding by experience, to a particular contact pressure which is not to be exceeded. Thereafter, the manual or automatic control may be applied to the pelletizer knife adjusting mechanism to control the contact between the individual knives of the knife assembly and the die plate face in accordance with the indicated or measured amplitude of the selected signature.

If desired, compensation for blade wear may be incorporated on a timer basis where the blade assembly is moved toward the die plate at an operator entered time interval. A desired running gap may also be entered which will be automatically maintained.

The computer also may be programmed to cause the motor 110 to bring the blades into contact with the die plate in a sharpening sequence, in which a designated contact pressure will be maintained with the die plate for a given period of time, as selected by the operator.

It will therefore be seen that this invention provides apparatus and method by which the knife blade assembly of a pelletizer may be accurately and positively controlled with respect to its position adjacent a die face for optimum operation of a pelletizer. Ambiguity as to the fact of contact and the pressure or extent of contact is eliminated by the detection of unique "signature" frequencies, and by the control of the pelletizer adjustment mechanism in accordance with the presence and/or measured amplitude of such signal. The method and apparatus is of particular advantage in that the only modification required to the pelletizer, itself, is that of the mounting of an accelerometer on the die plate body. Such devices are rugged and are able to withstand anticipated temperature excursions, and can be readily replaced from a position on an exterior surface of a body, if the need should arise. Further, the system is particularly adapted for application to existing pelletizers with a minimum of modification required.

Figure 9:
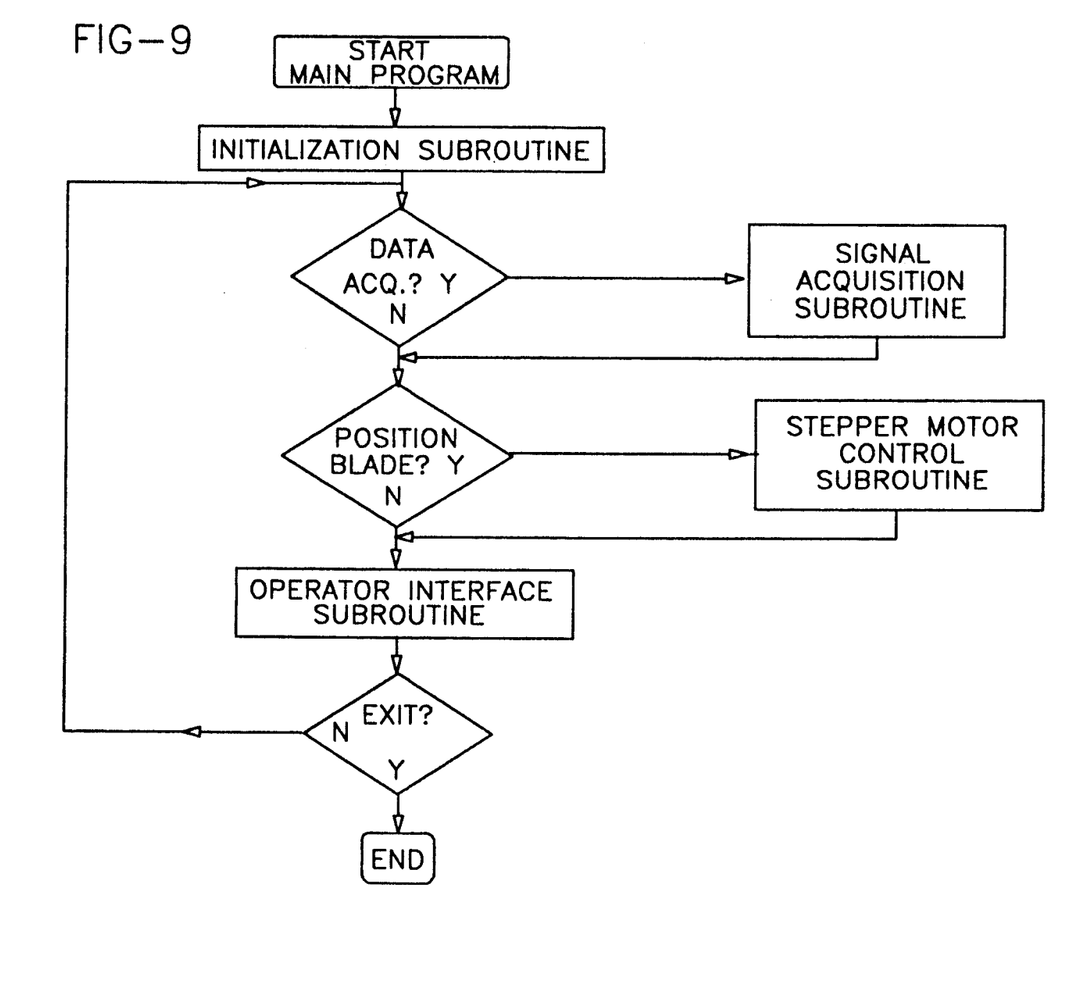

The flow charts illustrate software for controlling the computer and making the Fast Fourier Transform (FFT) necessary to convert the digitized accelerometer signal to frequency domain. FIG. 9 shows a flow chart of the main program which includes four subroutines; the initialization subroutine, the signal acquisition subroutine, the stepper motor control subroutine, and the operator interface subroutine.

The computer software will read the current blade position from the indexer, will display on the operator interface terminal the FFT array and the current blade position, will scan the FFT array and compare the array with a window of frequencies and amplitudes set by the operator, will determine the amount and axial direction of movement and command the indexer to move the motor 110 in either direction to position the blades as desired.

Figure 10:
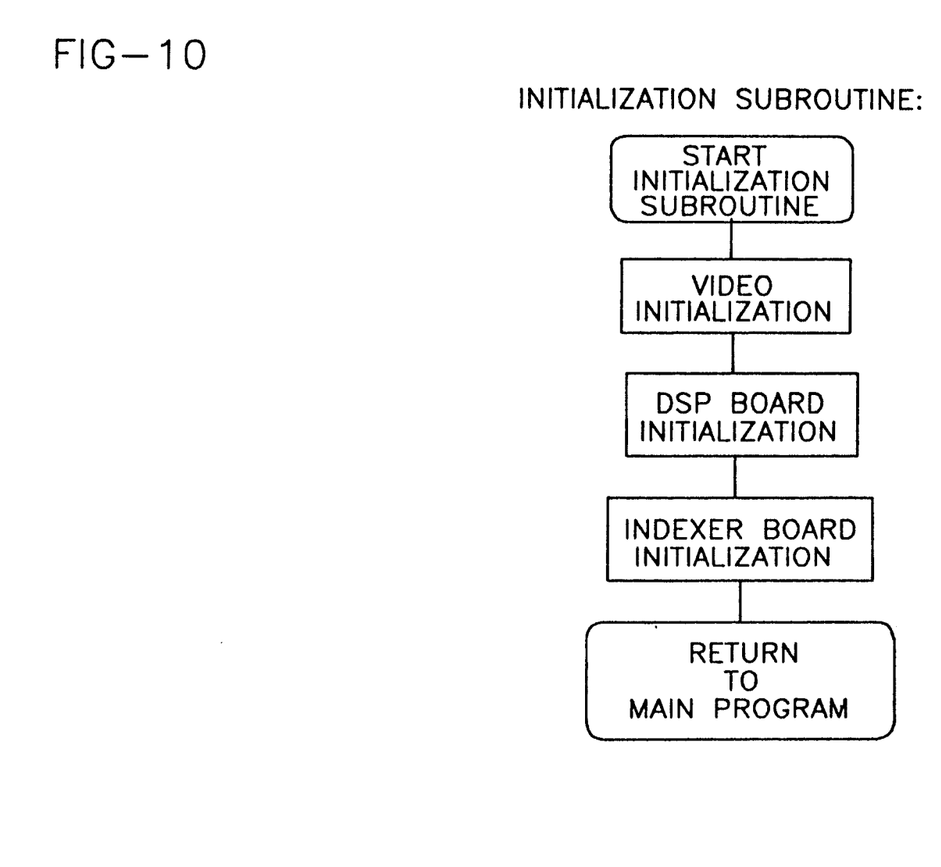

In FIG. 9 the main program is started with the initialization subroutine, FIG. 10. The initialization subroutine starts up the computer and initializes the video, the digital signal processor (DSP) board, and the indexer board. This initialization sets the DSP board and indexer with software to the appropriate configurations for indicating the blade position and adjusting the blade position. Once the initialization subroutine is complete, the program returns to the main program and asks if data acquisition is needed. If the response is "yes" then the main program goes into the signal acquisition subroutine, FIG. 11.

Figure 11:
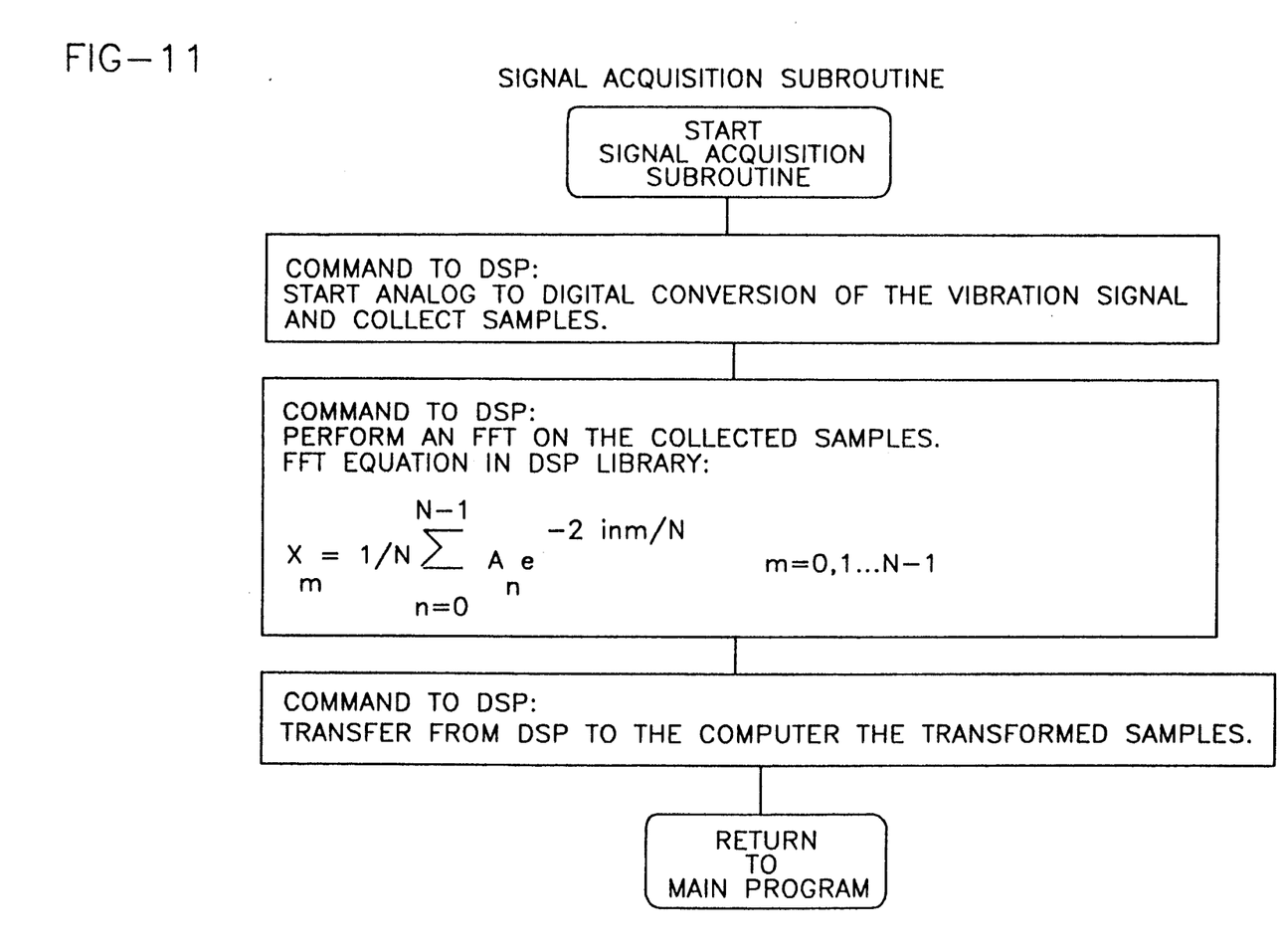

In FIG. 11, the signal acquisition subroutine starts by an analog-to-digital conversion of the vibration signal from the accelerometer 200 and collects digital sample signals from this conversion. For example, one sample may be collected for every 0.0001 second. Then the DSP board performs an FFT on the collected samples. The basic FFT equation in the DSP library which is used to transform the vibration signal into the time frequency domain is shown in FIG. 11. Following the FFT, the DSP transfers the FFT data from the DSP to the computer and returns to the main program FIG. 9.

Figure 12:
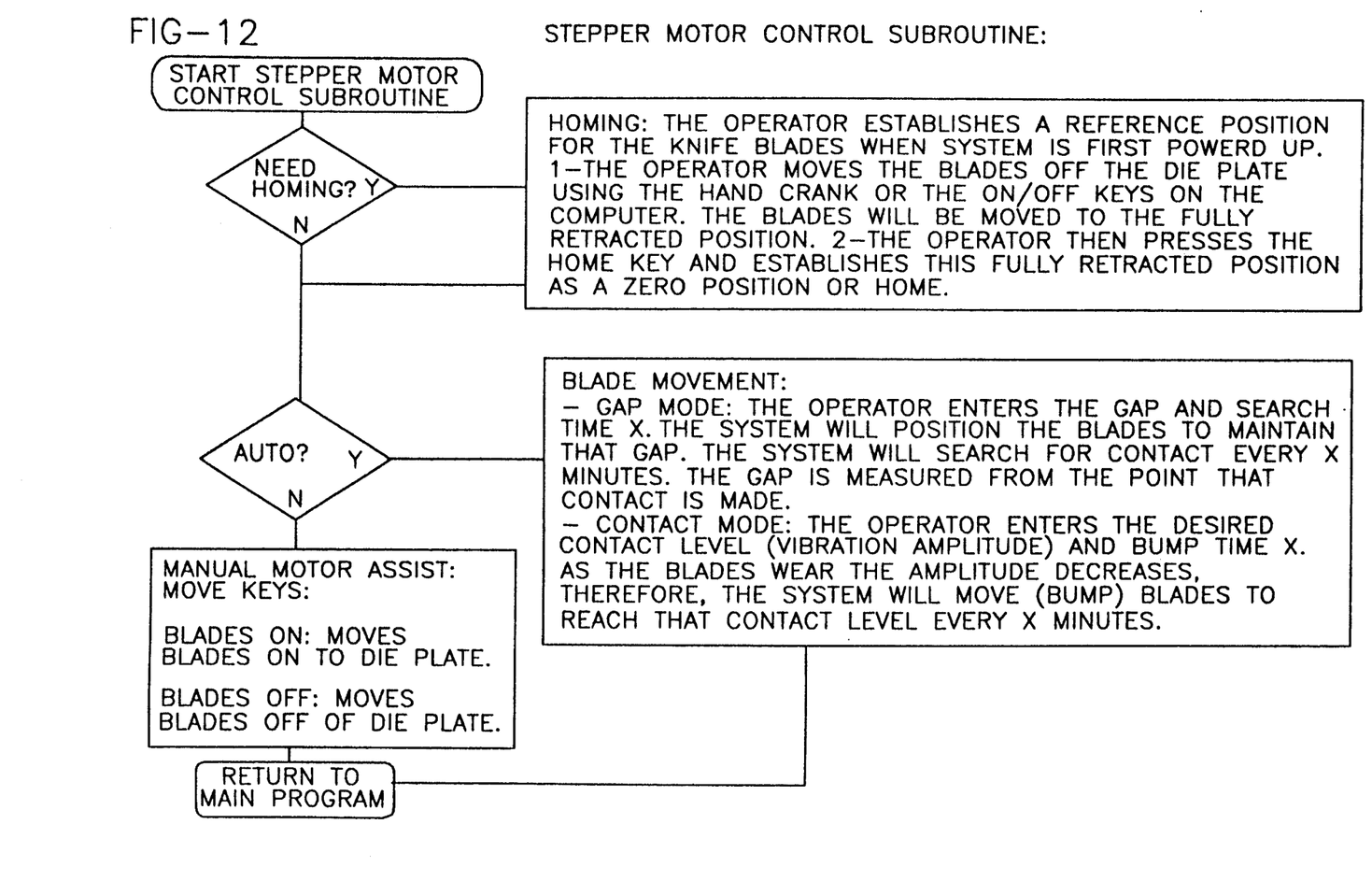

Next, the main program asks if the blades need to be positioned and if so, the stepper motor control subroutine is performed to position the blades accordingly. In FIG. 12 the stepper motor control subroutine asks the operator if a reference point is needed to be set, which is called "homing." The operator establishes this reference position when the program is first powered up. Thus homing is only needed once. If homing is needed, then the operator moves the blades off the die plate using a hand crank or the designated On-Off keys of the computer. The operator determines that the blades are off the die plate by observing the operator interface terminal which displays the FFT data. Once the FFT signal which indicates that the blades are touching the die plate, is no longer displayed, then the operator knows that the blades are off the die plate. This is known as the retracted position. Next, the operator then presses the home key which establishes this retracted position as the zero or home position.

Following homing, the stepper motor control subroutine asks the operator if he would like the blades positioned automatically by the program. If automatic positioning is desired, then the blades are positioned by the gap mode or the contact mode.

In the gap mode the operator enters the gap and the search time X which is desired. For example, a gap of 0.003 inch and a search time of 30 minutes. The system will then position the blades to maintain the chosen gap and will search for contact every 30 minutes. The gap is measured by the initial contacting of the blades 45 with the die plate face 24.

In the contact mode the operator enters the desired contact level, which is the desired vibration amplitude of the FFT data displayed on the monitor, and the bump time X. The bump time is the length of time in which the blades are checked to determine if an adjustment of the blades is needed to maintain the amplitude of the FFT contact signal. As the blades wear the amplitude of the vibration decreases and the system will adjust- (bump) the blades to reach that FFT contact signal at the bump time x.

If automatic control is not desired, then the operator can manually move the blades to the desired position by observing the amplitude of the FFT contact signal on the operator interface terminal and by moving the blades with the blades' "On" keys or the blades' "Off" keys designated on the computer.

The program allows the operator to determine which is the most beneficial position of the blades in the pelletizer such that he can input the desired time and vibration level in the contact mode, or the desired gap and bump time in the gap mode. Furthermore, the manual positioning capability allows the initial setup of the pelletizer and provides a determination of when the blades are in contact, and determines the amplitude of the FFT contact signal for this particular pelletizer.

Figure 13:
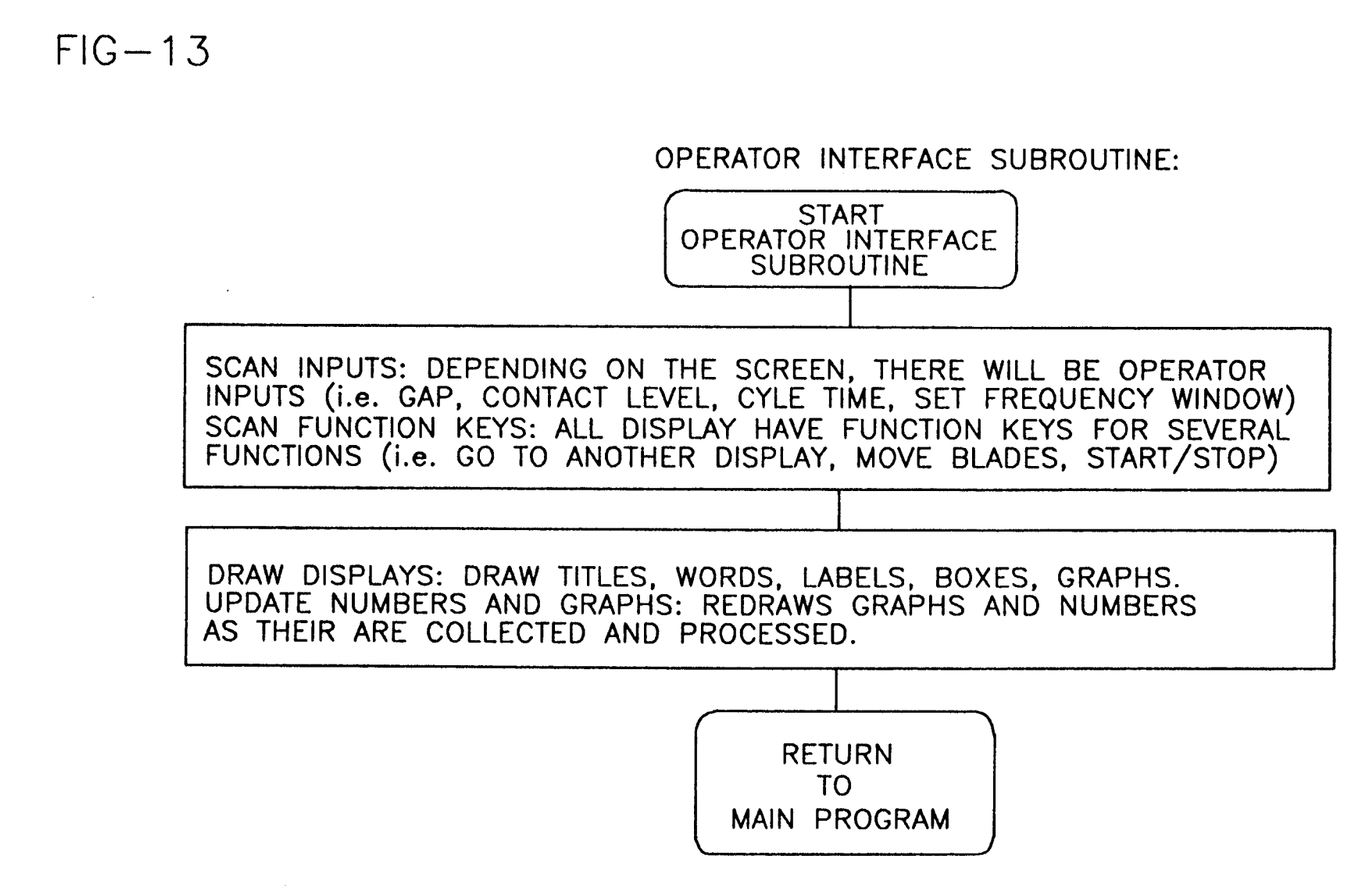

Once the stepper motor control subroutine is complete, the system returns to the main program where it enters into the operator interface subroutine. During this subroutine the operator will input the gap, contact level, cycle time, set the frequency window and various other inputs needed for the computer to position the blades. Furthermore, the predetermined function keys are scanned to determine if there was an input by the operator such as "Go To Another Display" or "Start-Stop." Following the scanning of the inputs and the function keys, the displays are drawn which includes the words, labels, boxes, and graphs, with the numbers and graphs being updated as they are collected and processed.

After updating, the system returns to the main program in which it is determined if the operator desires to exit the program or continue through the loop of the signal acquisition subroutine, stepper motor control subroutine and operator interface subroutine. This loop is continuous until the operator desires to exit the software.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In a pelletizer having a die plate body in which plastic resin material at an elevated temperature is extruded through a plurality of orifices formed in the face of an annular die plate in said die plate body, a hub which has pellet cutting knife blades therein, said hub being mounted on a drive shaft with said blades coacting with said die plate face for severing pellets of said resin material at said die plate face, and in which said drive shaft hub and blades are movable by shaft positioning means axially of the direction of shaft rotation toward and away from said die plate face to control the spacing between said blades and said face, the improvement in means for positioning said blades in relation to said die plate face, comprising:

piezoelectric accelerometer means mounted on said die plate body and operable to provides an electric analog signal representative of the vibrational accelerations of said die plate, a computer, means in said computer receiving said analog signal and converting said signal to a digital signal, means in said computer receiving said digital signal effecting a Fast Fourier Transform thereon and providing a frequency domain output, signal processing means connected to receive said frequency domain output and responding to the occurrences of said accelerations at a discrete portion of said frequency domain output representing contact by said blades against said die plate face and providing a contact signal output, and means connected to receive said contact signal output for controlling said shaft positioning means.

2. In a pelletizer in which plastic resin material is extruded through a plurality of orifices formed in the face of a die plate mounted on a die plate body, and in which a knife assembly is mounted on a drive shaft and has a plurality of pellet cutting knife blades mounted thereon which coact with the face of said die plate for severing pellets of said resin material at said face as said knife assembly is rotated by said shaft, and in which shaft positioning means moves said drive shaft and said knife assembly thereon in a direction axially of the direction of shaft rotation toward and away from said die plate face, the improvement in means for controlling said positioning means and said knife assembly carried on said shaft, in relation to said die plate face, comprising:

vibration detecting pickup means in the form of a piezoelectric accelerometer, means mounting said pickup means on said pelletizer in relation to said die plate body so that said pickup means responds to vibrational excursions induced by contact of said knife blades with said die plate face, said pickup means having an output in the form of a time domain electric signal representative of said vibrational excursions, signal processing means for performing a Fast Fourier Transform for converting the electric time domain signal to a frequency spectrum, means connecting said signal processing means to receive said electric signal from said pickup means, said signal processing means being operable to produce a first form of signal upon the occurrence of a pattern of said electric signals representing contact by said blades against said die plate face and being further operable to provide a second form of signal in response the magnitude of said electric signal representative of the degree of force of said contact between said blades and said die plate face, and control means connected to received said first and second forms of signals from said signal processing means and providing instructions to said shaft positioning means for moving said knife assembly in relation to said die plate face.

* * * * *